United States Patent [19]
Sakoe

[11] Patent Number: 5,121,465
[45] Date of Patent: Jun. 9, 1992

[54] PATTERN MATCHING SYSTEM
[75] Inventor: Hiroaki Sakoe, Tokyo, Japan
[73] Assignee: NEC Corporation, Tokyo, Japan
[21] Appl. No.: 508,503
[22] Filed: Apr. 11, 1990

Related U.S. Application Data
[63] Continuation of Ser. No. 168,773, Mar. 16, 1988, abandoned.

[30] Foreign Application Priority Data
Mar. 16, 1987 [JP] Japan .................................. 62-61734
Mar. 16, 1987 [JP] Japan .................................. 62-61736
[51] Int. Cl.$^5$ .............................................. G10L 5/00
[52] U.S. Cl. ........................................... 395/2; 381/43
[58] Field of Search .................. 364/513.5; 381/41-43

[56] References Cited
U.S. PATENT DOCUMENTS
4,277,644 7/1981 Levinson et al. ...................... 281/43
4,286,115 8/1981 Sakoe ................................... 381/43
4,319,221 3/1982 Sakoe ................................... 381/43

OTHER PUBLICATIONS
L. R. Rabiner et al., "On the Performance of Isolated Word Speech Recognizers Using Vector Quantization and Temporal Energy Contours", AT&T Bell Lab Technical Journal, vol. 63, No. 7, Sep., 1984, pp. 1245-1260.

Primary Examiner—Emanuel S. Kemeny
Attorney, Agent, or Firm—Sughrue, Mion, Zinn, Macpeak & Seas

[57] ABSTRACT

A pattern matching system including a calculating arrangement for calculating a current value of cumulative distances between an input pattern and a reference pattern of a current pattern number at a current input pattern time instant and a current reference pattern time instant by using a dynamic programming algorithm which decreases workload because the current value is selected as a selected distance only when the current value is not greater than a threshold value which is determined at the current input pattern time instant. Work areas or memories are used as a result memory device accessed by a combination of the current input and reference pattern time instants for memorizing or storing the selected distance, the current pattern number, and the current reference pattern time instant, which are for later use in calculating another of the cumulative distances. Preferably, the threshold value should monotonously increase with time. More preferably, two of the work areas are alternatively used.

3 Claims, 9 Drawing Sheets

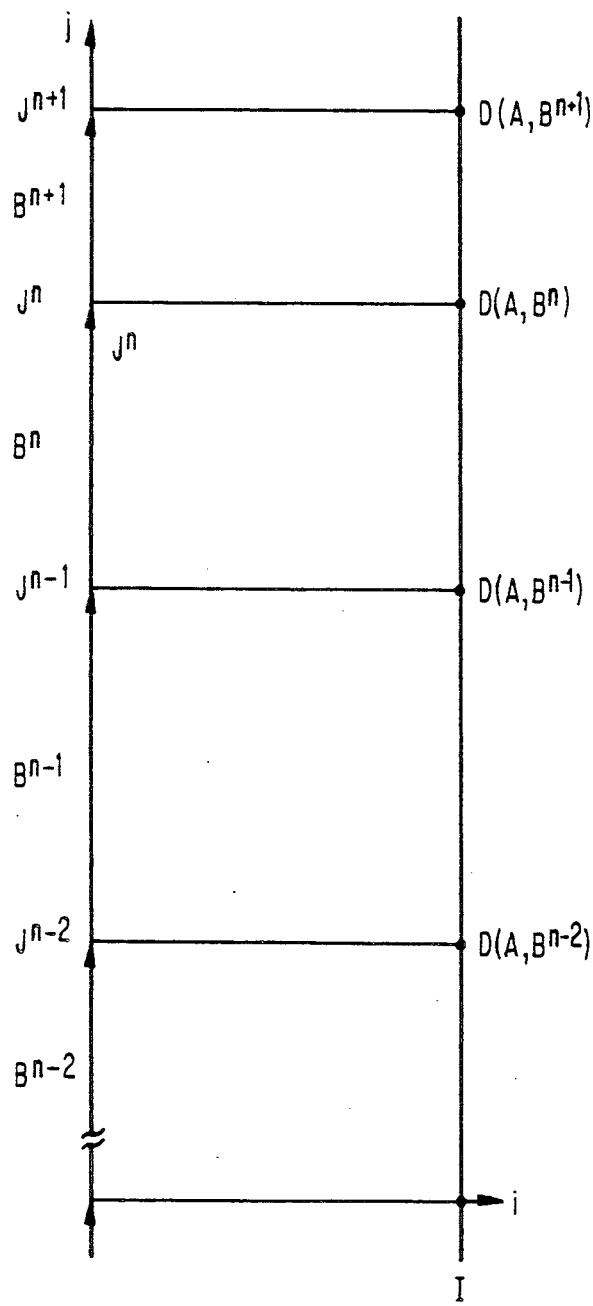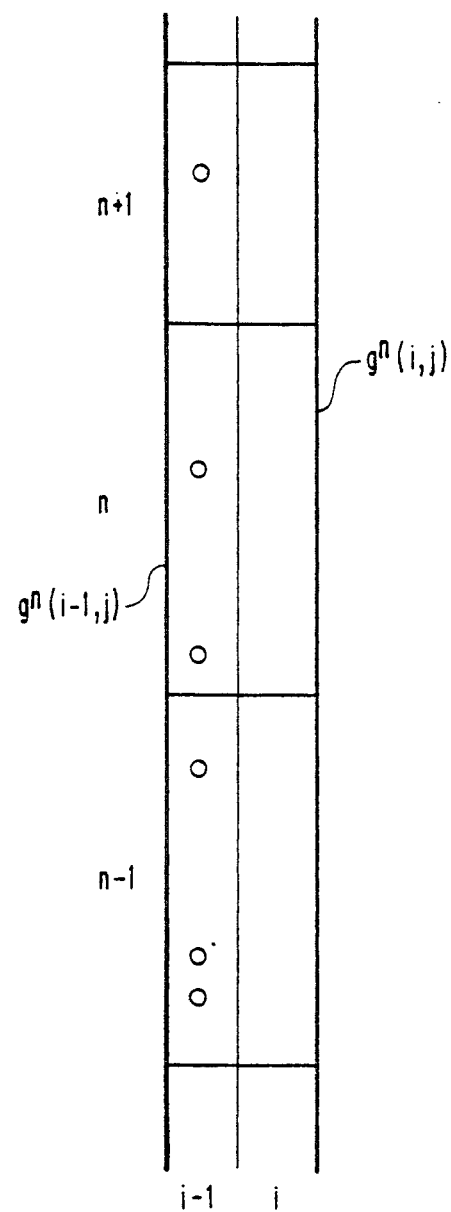

FIG. 3A

| | | |
|---|---|---|
| | | |
| | | |
| ¦ | ¦ | ¦ |
| G1(k) | n1(k) | j1(k) |
| ¦ | ¦ | ¦ |

FIG. 3B

| | | |
|---|---|---|
| | | |
| | | |
| ¦ | ¦ | ¦ |
| G2(k) | n2(k) | j2(k) |
| ¦ | ¦ | ¦ |

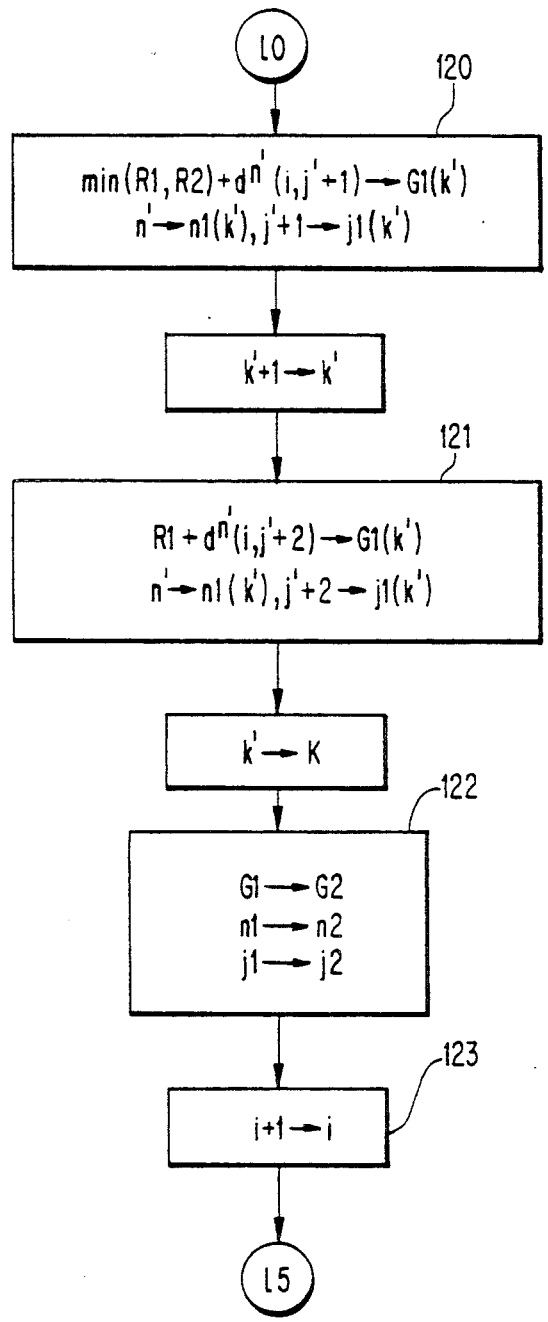

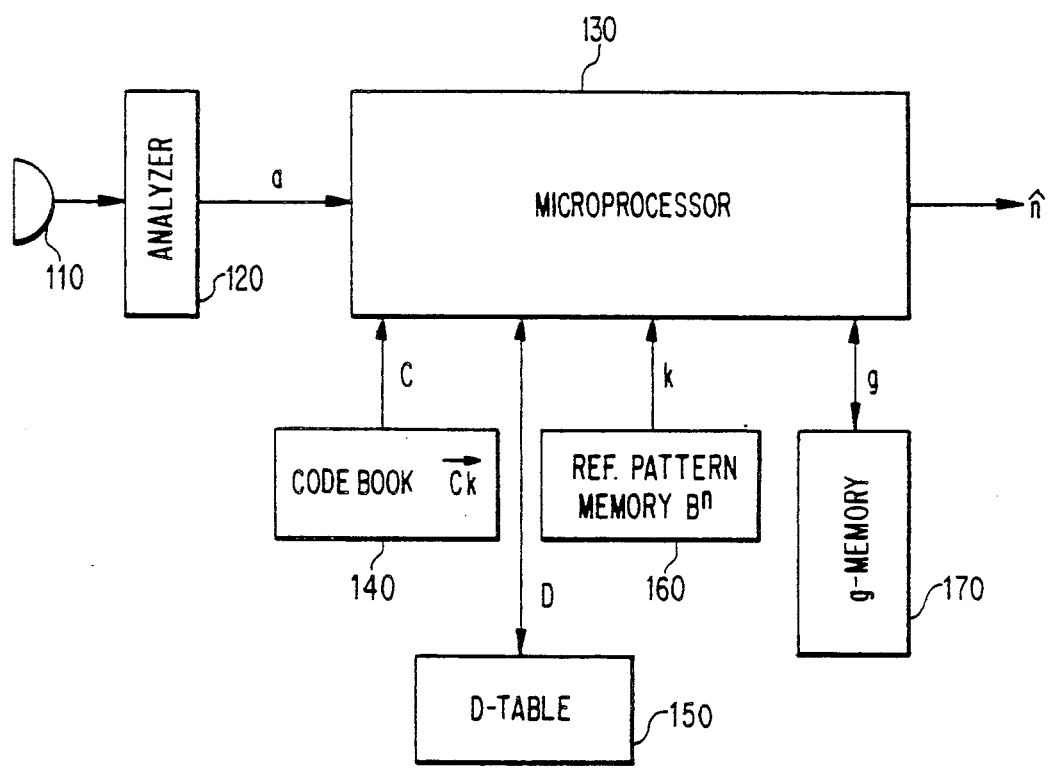

PATTERN MATCHING SYSTEM

This is a continuation of application Ser. No. 07/168,773 filed Mar. 16, 1988 now abandoned.

BACKGROUND OF THE INVENTION

The present invention relates to a pattern matching system available for various systems such as speech recognition system.

There have been proposed various technologies of the pattern matching in speech recognition; the DP (dynamic programming) matching method disclosed in U.S. Pat. No. 3,816,722 is one of the most popularly used methods. The clockwise DP method disclosed in U.S. Pat. No. 4,592,086 is a continuous speech recognition method with syntax control or an isolated speech recognition method. For simplicity's sake, description will be given herein only to the clockwise DP method of the type for isolated speech recognition.

A set of words is assumed to be an object of recognition wherein the name of a word is designated by a numerical number n.

$$\{n | n = 1, 2, \ldots N\}$$

A reference pattern is prepared for each word as below:

$$B^n = \vec{b_1^n}, \vec{b_2^n} \ldots \vec{b_j^n} \ldots \vec{b_J^n}$$

wherein j denotes a time point, and $b_j^n$ a feature of the reference pattern $B^n$ at the time point j.

An input speech pattern is expressed similarly as below:

$$A = \vec{a_1}, \vec{a_2} \ldots \vec{a_i} \ldots \vec{a_I}$$

Speech recognition is performed by calculating the distance between the input pattern A and the reference pattern $B^n$, and determining the word n giving the minimum cumulative distance as the recognition result.

In the DP matching method, the above cumulative distance is calculated by the dynamic programming (DP) as follows:

○ initial conditions $$g^n(1, 1) = d^n(1, 1) \tag{1}$$

○ recurrence formula $$g^n(i, j) = d^n(i, j) + \min \begin{bmatrix} g^n(i - 1, j) \\ g^n(i - 1, j - 1) \\ g^n(i - 1, j - 2) \end{bmatrix} \tag{2}$$

$$i = 1, 2, \ldots I$$
$$j = 1, 2, \ldots J$$

○ distance $D(A, B^n)$ between patterns is determined in accordance with the formula (3).ps $$D(A, B^n) = g^n(I, J^n) \tag{3}$$

wherein $d^n(i, j)$ denotes the distance between features $\vec{a_i}$ and $\vec{b_j^n}$ i.e., $\|\vec{a_i} - \vec{b_n^n}\|$. A cumulative distance is expressed by $g^n(i, j)$ and is called an optimal cumulative distance.

The DP matching process was initially executed for each word, but is improved later in the clockwise DP method so as to be executed in parallel for plural words respectively. More particularly, in the clockwise DP method the optimal cumulative value $g^n(i, j)$ is calculated for n and j specified by all the combinations of n and j for each time i of the input pattern in a space defined by i, j and n as shown in FIG. 1 with increasing the time i to complete the process.

In practice, however, it is not necessary to prepare work areas for all the spaces. The calculation of the formula (2) can be proceeded with the work areas for two time points, i.e., i and (i−1). This clockwise DP method is excellent in real-time processing with shorter response time since the process can be executed in synchronization with the input of feature $\vec{a_i}$ of the input pattern.

However, in the DP matching method, the amount of the distance calculation still causes problem: the features $a_i$ and $b_j^n$ are generally vectors of ten or higher dimension order, and it is an extremely heavy load for an ordinary hardware to conduct the distance calculations of $$\sum_{n=1}^{N} J^n$$

times within one clock (usually about 10 ms).

In order to solve the problem, L. R. Rabiner et al have proposed a method using vector quantization in a paper entitled "On the Performance of Isolated Word Speech Recognizers Using Vector Quantization and Temporal Energy Contours", AT&T Bell Laboratories Technical Journal, Vol. 63, No. 7, September issue, 1984. pp. 1,245–1,260. In the method, a set $\{\vec{C_k}\}$ of code vectors is prepared. The features $\{\vec{b_j^n}\}$ of the reference pattern is approximated by the code vectors. Namely, each reference pattern $B^n$ is expressed as a time series of the number $k = k(n, j)$ specifying the code vector $C_k$ is the most similar to each $b_j^n$. Then, the distance D(k) between the feature $a_i$ of the input pattern and each code vector is calculated and stored in a table during the time of DP matching processing. At the time of recurrence formula calculation, the formula (2) is calculated with reference to the equation (4).

$$d^n(i, j) = D(k(n, j)) \tag{4}$$

The distance calculation amount can be reduced by employing the vector quantization method, but not to a satisfactory extent.

In general, the required number of code vectors is more than 256 for maintaining the good recognition rate. If it is assumed that one calculation of D(i, k) requires 40 μs, the calculation for 256 vectors would take 10 ms. In other words, one clock for i (10 ms) is almost completely consumed by the calculation of vector distance to leave no time for recurrence formula calculation. For this reason, a high speed hardware specially designed for the purpose has heretofore been used for executing DP matching.

Moreover, when the above-mentioned clockwise DP method is used for recognition of large vocabularly speech, the work area inevitably becomes large in order to retain $g^n(i, j)$ and the calculation amount is enormous. More specifically, the recurrence formula (2) should be executed and stored for all the combinations of n and j within one cycle of i. Where the reference pattern length is $J^n=30$, and $N=1000$ words are to be recognized, the formula (2) should be calculated at the points in the number of as many as $3 \times 10^4$ and the result should be retained.

SUMMARY OF THE INVENTION

An object of this invention is to provide a pattern matching system which can remarkably reduce the amount of calculation for DP matching.

Another object of this invention is to provide a pattern matching system which enables the high speed DP matching operation.

Still another object of this invention is to provide a pattern matching system which enables the high speed operation for a large vocabularly speech recognition.

Still another object of this invention is to provide a speech recognition system which enables recognition with a shorter response time.

Still another object of this invention is to provide a pattern matching system with smaller work areas.

According to the present invention, there is provided a pattern matching system including:

means for memorizing a reference pattern of each word n as a time series of features $\vec{b_j^n}$ at time points j;

means for temporarily memorizing an input speech pattern $\vec{a_i}$ for times points i;

means for calculating an elementary distance $d^n(i, j)$ between the features $\vec{a_i}$ and $\vec{b_j^n}$ at a current point of the time points i;

means for calculating an optimal cumulative distance based on the elementary distance and previous cumulative distances obtained previous to the current point in accordance with a recurrence formula of dynamic programming;

restriction means for restricting a range of combinations (n, i) of the word n and the time points j at the current point for the previous cumulative distances; and means for producing a memory area for the previous cumulative distances and the combinations (n, j).

According to another aspect of the invention, there is provided a pattern matching system for carrying out pattern matching between an input pattern (A) and a plurality of reference patterns having first through N-th pattern numbers, respectively, the input pattern being represented by a time sequence of input pattern features arranged at first through I-th input pattern time instants, respectively, the pattern matching system according to this aspect of the invention comprising:

pattern memory means for memorizing the reference patterns according to the first through the N-th pattern numbers and with each of the reference patterns represented by a time sequence of reference pattern features arranged at first through J-th reference pattern time instants, respectively, the J-th reference pattern time instant being specific to said each of the reference patterns;

calculating means connected to the pattern memory means and supplied with the input pattern for calculating a current value ($g^n(i, j)$) of cumulative distances at a current input pattern time instant (i) with the current input pattern time instant varied from the first input pattern time instant consecutively to said I-th input pattern time instant and with variation at the current input pattern time instant of a current pattern number (n) between the first and said N-th pattern numbers and of a current reference pattern time instant (j) between the first reference pattern time instant and the J-th reference pattern time instant of one of the reference patterns that has the current pattern number, the current value being calculated by a recurrence formula as a sum of an elementary distance and a minimum of a plurality of previous values of the cumulative distances, the elementary distance being a distance between one of the input pattern features and one of the reference pattern features of one of the reference patterns that has the current pattern number, the one of the input pattern features being arranged at the current input pattern time instant, the one of the reference pattern features being arranged at the current reference pattern time instant, the previous values being calculated prior to the current input pattern time instant; and result memory means connected to the calculating means and accessed by a combination (k) of a selected one (n) of the first through the N-th pattern numbers and a selected one (j) of the first reference pattern time instant through the J-th reference pattern time instant of one of the reference patterns that has the selected one of the first through the N-th pattern numbers;

the calculating means selecting the current value is not selected distance (G1(k)) only when the current value is not greater than a threshold value ($\theta(i)$) predetermined for the current input pattern time instant, the calculating means storing the selected distance, the current pattern number, and the current reference pattern time instant as a previous distance (G2(k)), as a previous pattern number (n2(k)), and as a previous reference pattern time instant (j2(k)) in the result memory means with the previous pattern number and the previous reference pattern time instant used to define the combination, the previous distance being for use as one of said previous values on calculating another value of the cumulative distances at one of the first through the I-th input pattern time instants that is later than the current input pattern time instant restriction means for restricting a range of combinations (n, j) of the words n and the time points j for new optimal cumulative values $g^n(i, j)$ which are to be calculated based on the previous optimal cumulative value for each time point i; and means for producing memory area exclusively for the optimal cumulative values of the combinations (j, j). In the above invention the memory area generation is controlled by mutual relation between the combination (n, j) at the time point i and the combination (n', j') of a word n' and a time point j' processed at a time point (i−1) one time point previous to the time point i.

Other objects and features will be clarified from the following description with reference to the drawings.

BRIEF DESCRIPTION OF THE DRAWINGS

FIG. 1 is a graph to explain the clockwise DP matching used in an embodiment of this invention;

FIG. 2 is a chart to explain the principle of this invention;

FIGS. 3A and 3B are structural views of work areas used in the embodiments of this invention;

FIGS. 6A through 6E are operational flow charts to describe the embodiment of FIG. 5;

FIG. 7 is a structural view of another embodiment of the speech recognizer according to this invention.

DETAILED DESCRIPTION OF THE PREFERRED EMBODIMENTS

Figure 4A:
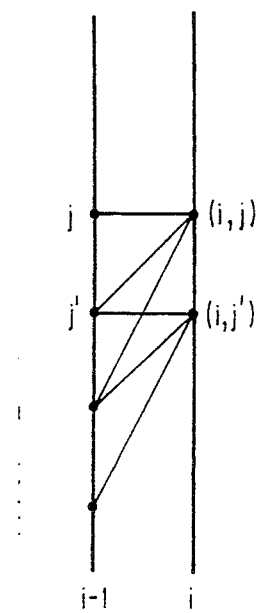
FIGS. 4A through 4C are diagrams to show matching paths to explain the principle of this invention.

DP matching seeks an optimal path giving the minimum total sum of the distance $d^n(i, j)$ from the point (1, 1) to the point I, $J^n$) or the minimum cumulative value of the distance $D(A, B^n)$ for each word. Since the optimal cumulative value $g^n(i, j)$ represents a cumulative value to the distance $d^n(i, j)$ from the point (1, 1) to the point (i, j), the point (i, j) having large $g^n(i, j)$ is less likely to be on the optimal path. This invention system increases the operation speed by omitting at each time point i the recurrence formula calculation in DP matching when the value $g^n(1, j)$ is estimated to be large.

More specifically, as shown in FIG. 2, the optimal cumulative value $g^n(i, j)$ calculated at the previous clock (time point) (i−1) is evaluated by a specified standard, and a set w (each illustrated with a mark o in FIG. 2) of points (n, j) having the small cumulative value is determined so that the recurrence formula is calculated for points in proximity of these points.

Figures 3A, 3B:
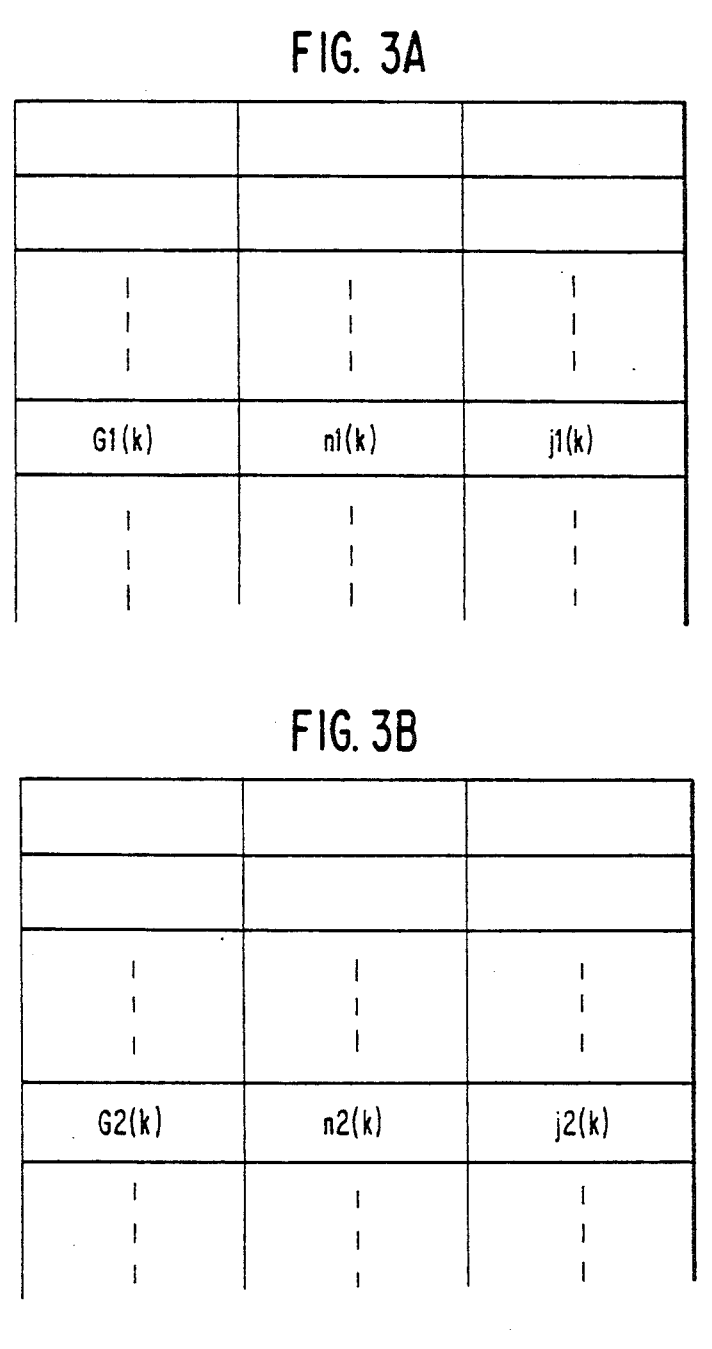

Although this method could reduce the amount of calculation, there still remains a problem that the memory area for $g^n(i, j)$ is large. The system according to the present invention may produce a work area for storing $g^n(i, j)$ which is newly determined to eliminate the necessity of storing $g^n(i, j)$ which is unnecessary to be determined. FIGS. 3A and 3B show embodiments of the structure of such work areas. In the first area of FIG. 3A, $g^n(i, j)$ is stored in $G_1(k)$, and the corresponding n and j are stored in $n_1(k)$ and $j_1(k)$, respectively. In the second area of FIG. 3B, the information at the time point (i−1) is stored. In $G_2(k)$ is stored $g^n(i−1, j)$ and the corresponding n and j are stored in $n_2(k)$ and $j_2(k)$, respectively.

Under such a storing manner of $g^n(i−1, j)$ and $g^n(i, j)$, it becomes impossible to execute the recurrence formula (2) since a part or all of the right side terms $g^n(i−1, j)$, $g^n(i−1, j−1)$ and $g^n(i−1, j−2)$ might not be stored as $G_2(k)$, $n_2(k)$ and $j_2(k)$.

According to the invention, the recurrence formula calculation and the work area production for $g^n(i, j)$ are controlled on the basis of the mutual relation between the (n, j) which is to be executed and the (n', j') which were processed immediately before.

The principle of this invention will be described referring to the recurrence formula (2) of dynamic programming. The large optimal cumulative value $g^n(i−1, j)$ would be excluded by the minimum value detection in the recurrence formula (2) and is least likely to contribute to the future determination of the optimal cumulative value. Therefore, threshold $\theta(i)$ is determined at respective time point i to omit the processing which involves the optimal cumulative value of:

$$g^n(i-1, j) > \theta(i) \qquad (5)$$

In other words, the processing is conducted for (n, j) corresponding to $n = n_2(k)$, and $j = j_2(k)$ where $G_2(k) \leq \theta(i)$.

Then, a combination (n', j') of $n' = n_2(k)$ and $j' = j_2(k)$, where $G_2(k) \leq \theta(i)$, which have been processed at a time immediately prior to k is considered. Registers R0, R1 and R2 are incorporated within a processor which conducts the recurrence formula calculation. At the time point when the processing at (n', j') has been completed, the relation holds as $R1 = g^{n'}(i−1, j')$, $R2 = g^{n'}(i−1, j'−1)$. Under this state, the processing at (n, j) can be classified as follows in accordance with the relation between (n, j) and (n', j').

(A) under $n = n'$, $j - j' = 1$

This condition corresponds to the state shown in FIG. 4A. More particularly, $g^{n'}(i, j)$ is calculated at the point (i, j'), and $g^n(i, j)$ is calculated at the next point $j = j' + 1$. The content of the register R1 is $g^{n'}(i−1, j') = g^n(i−1, j−1)$ while that of the register R2 is $g^{n'}(i−1, j'−1) = g^n(i−1, j−2)$. $G_2(k) = g^n(i−1, j)$ is read out by the register R0, from which is calculated $g^n(i, j)$ as follows.

$$g^n(i, j) = d^n(i, j) + \min(R0, R1, R2) \qquad (6)$$

This value is written in $G_1(k')$, and n and j are also written in $n_1(k')$ and $j_1(k')$, respectively. After new information has thus been written in $G_1(k')$, $n_1(k')$ and $j_1(k')$, k' is counted-up by one. Then if the contents in the registers are transferred as R1→R2, R0→R1, $R1 = g^{n'}(i−1, j')$ and $R2 = g^{n'}(i−1, j'−1)$ are determined for the processing at (n, j).

In short, the operation under $n = n'$ and $j - j' = 1$ becomes as below wherein R0 has been set with $G_1(k) = g^n(i, j)$.

$$
\begin{array}{l}
(1)\ d^n(i, j) + \min(R0, R1, R2) \to G_1(k') \\
(2)\ n \to n_1(k'),\ j \to j_1(k') \\
(3)\ k' + 1 \to k' \\
(4)\ R1 \to R2,\ R0 \to R1
\end{array}
\qquad (7)
$$

(B) under $n = n'$, $j - j' = 2$

Figure 4B:
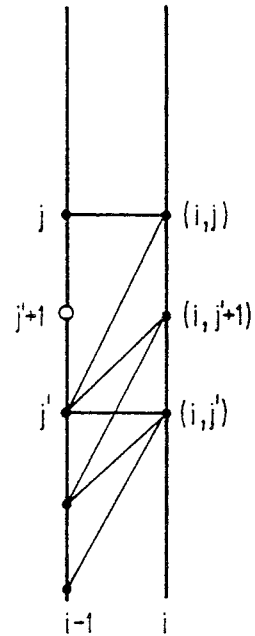

This condition corresponds to the state shown in FIG. 4B wherein $g^n(i−1, j'+1)$ is not included in the $G_2(k)$ table. However, $g^n(i, j'1)$ is calculated with $R1 = g^{n'}(i−1, j')$ and $R2 = g^{n'}(i−1, j'−1)$ as follows:

$$g^n(i, j'+1) = d^n(i, j'+1) + \min(R1, R2)$$

Further, since $g^{n'}(i−1, j') = g^n(i−1, j−2)$, the calculation is carried out as:

$$g^n = (i, j) = d^n(i, j) + \min(R0, R1).$$

The above operations can be summarized as follows:

$$
\begin{array}{l}
(1)\ d^n(i, j + 1) + \min(R1, R2) \to G_1(k') \\
(2)\ n \to n_1(k'),\ j + 1 \to j_1(k') \\
(3)\ k' + 1 \to k' \\
(4)\ d^n(i, j) + \min(R0, R1) \to G_1(k') \\
(5)\ n \to n_1(k'),\ j \to j_1(k') \\
(6)\ k' + 1 \to k' \\
(7)\ R0 \to R1,\ \infty \to R2
\end{array}
\qquad (8)
$$

In the operation (8), ($\infty \to R2$) means that an infinitely great number is set in the register R2 to indicate the fact that $g^n(i−1, j−1)$ is not defined.

(C) $n = n'$, $j \to j' > 2$

Figure 4C:
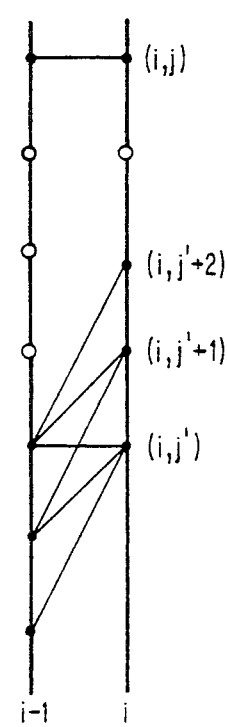

This condition corresponds to FIG. 4C and is analogous to the above (B). The following operations are to be conducted.

For calculation of $g^{n'}(i, j'+1)$ (1) $d^{n'}(i, j'+1) + \min(R1, R2) \to G_1(k')$ (2) $n' \to n_1(k')$, $j'+1$ $j_1(k')$
(3) $k'+1 \to k'$ For calculation of $g^{n'}(i, j'+2)$
(4) $d^{n'}(i, j'30\ 2)+R1 \to G_1(k')$
(5) $n' \to n_1(k')$, $j'+2 \to j_1(k')$
(6) $k'+1 \to k'$ For calculation of $g^n(i, j)$
(7) $d^n(i, j)+R0 \to G_1(k')$
(8) $n \to n_1(k')$, $j \to j_1(k')$
(9) $k'+1 \to k'$ For the preparation for the next $(n, j)$,
(10) $R0 \to R1$, $\infty \to R2$ (D) when $n \neq n'$ Since the contents of the registers R1 and R2 do not affect $g^n(i, j)$, the same operation as the above (C) will suffice.

As described above, the operation is switched depending on the mutual relation between $(n, j)$ and $(n', j')$. The above operation is conducted for all of $n=n_2(k)$ and $j=j_2(k)$ wherein $R0=G_2(k)>\theta(i)$ to complete the operation at the time i. Then $G_1(k)$, $n_1(k)$ and $j_1(k)$ are switched to $G_2(k)$, $n_2(k)$ and $j_2(k)$ respectively, and the operation proceeds to the next time as $i+1 \to i$.

This enables the operation equivalent to the conventional operation in the space $(n, i, j)$ without deteriorating the performance but with a smaller calculation amount and a smaller memory capacity.

Figure 5:
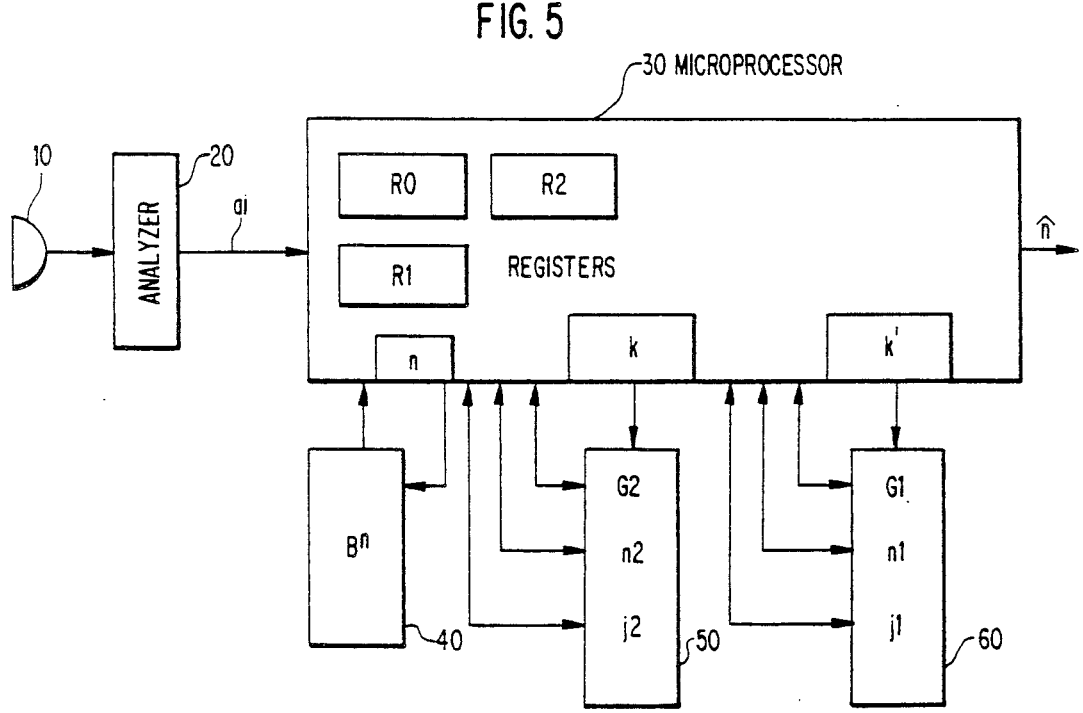
FIG. 5 is a structural view of an embodiment of the speech recognizer according to this invention.
Figure 6A:
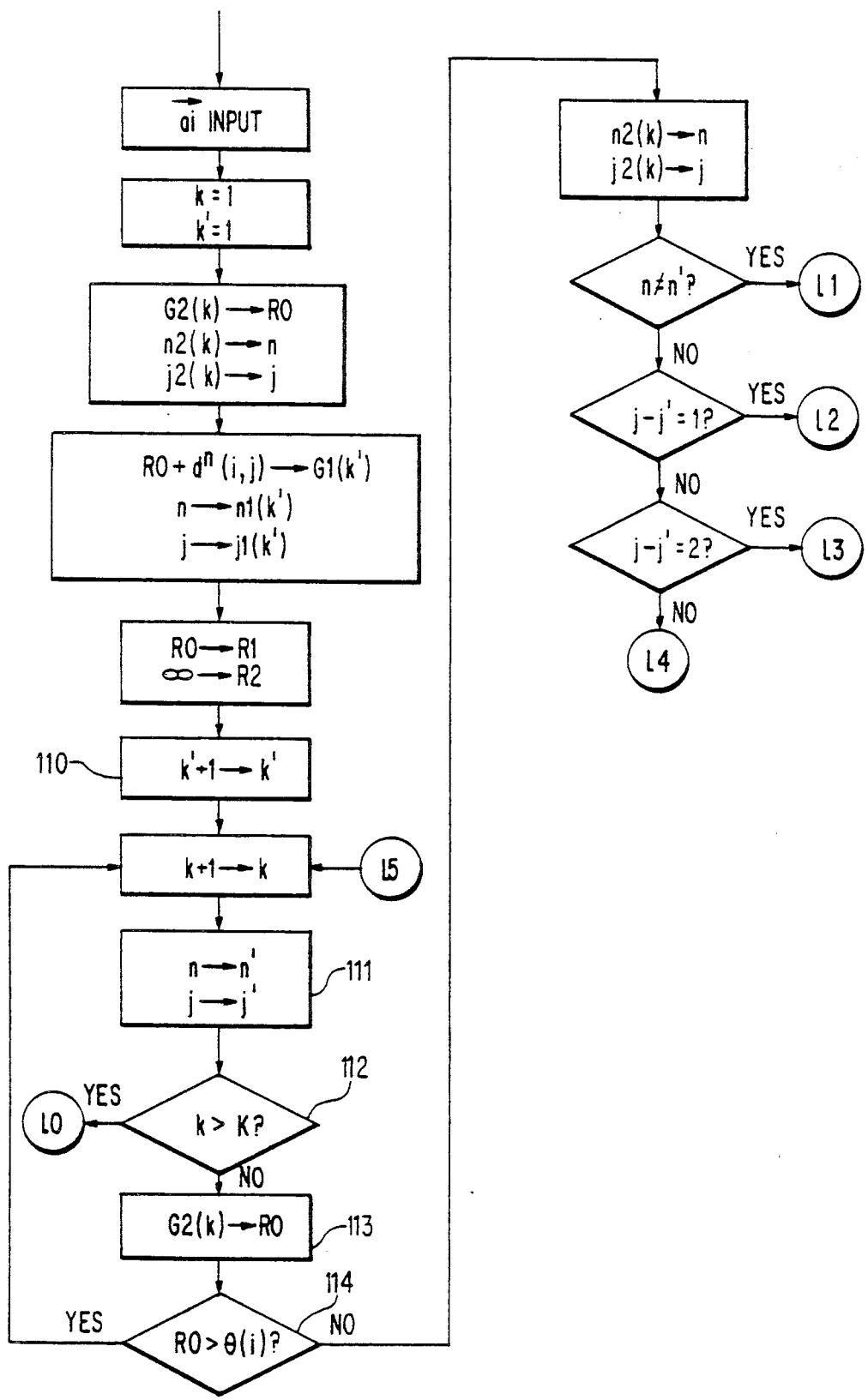
Figure 6C:
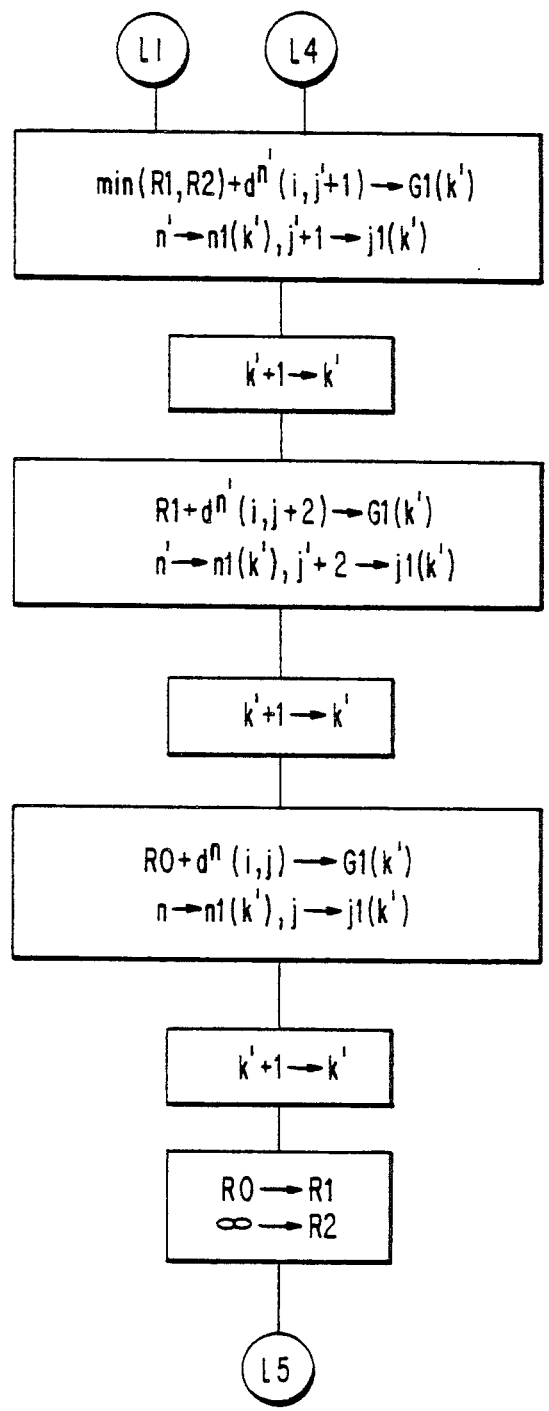
Figure 6D:
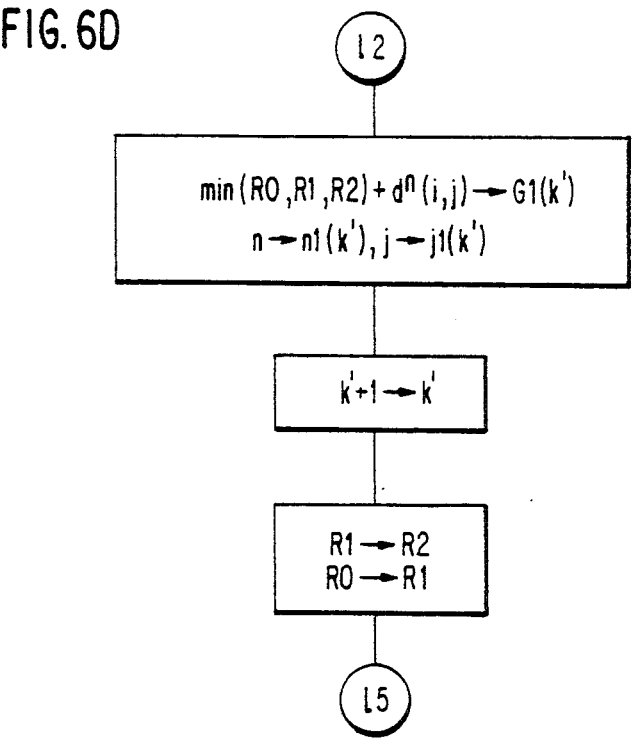
Figure 6E:
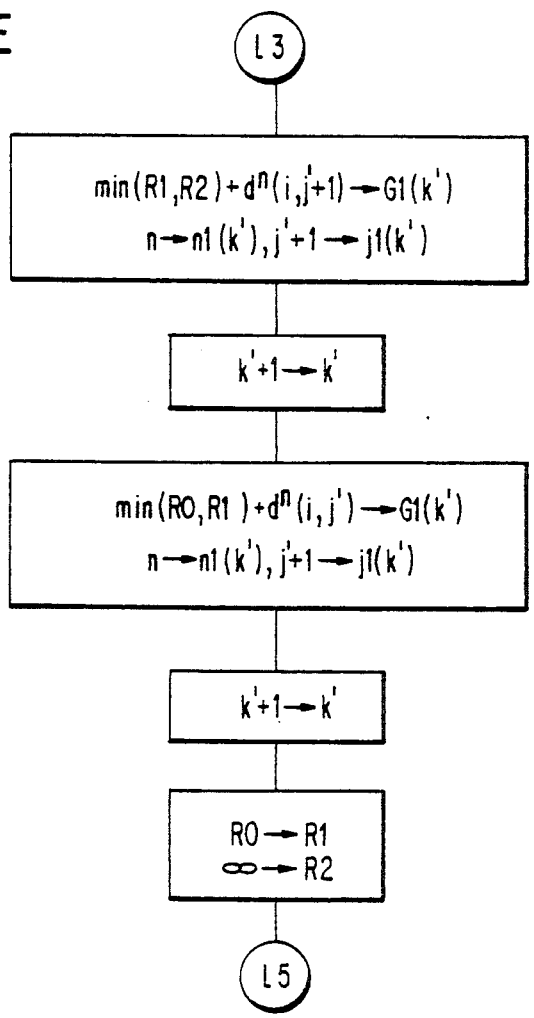

FIG. 5 shows an embodiment structure of the speech recognizer operable by the above pattern matching principle. A speech waveform inputted from a microphone 10 is analyzed in frequency by an analyzer 20, and the result is inputted to a microprocessor 30 as a time series of the features $a_i$. The microprocessor 30 incorporates registers R0, R1, R2, k, k' and n, and is connected to three types of memories 40, 50 and 60. The reference pattern memory 40 stores reference patterns $B^n = \bar{b}_1^n, \bar{b}_2^n \ldots \bar{b}_j^n \ldots \bar{b}_{j^n}^n$. The work memory 50 stores the data $G_2(k)$, $n_2(k)$ and $j_2(k)$ which were calculated. The work memory 60 provides the memory area for $G_1(k)$, $n_1(k)$ and $j_1(k)$ which are to be calculated newly. In response to the input of $\vec{a}_1$ of the input, the work memory 50 is initialized based on the equation (1) as follows:

$$\left. \begin{array}{ll} G_2(k) & = d^k(1, 1) \\ n_2(k) & = k \\ j_2(k) & = 1 \\ K & = N \end{array} \right\} \quad (9)$$

This corresponds to the initializing of $g^n(1, 1)=d^n(1, 1)$ for $n=1, 2 \ldots N$. FIGS. 6A through 6E show the flow chart of the operation when $\vec{a}_i$ is given at the time i. The operations from the input of $\vec{a}_i$ to the operation of the block 110 corresponds to the operation for $(n, j)$ wherein $k=1$. In the operation of the block 113, the $G_2(k)$ is transferred from the work memory 50 to the register R0, and is compared with the threshold $\theta(i)$ in the judgement block 114. There may be various definitions for the threshold $\theta(i)$. Noting that the quantity of $g^n(i, j)$ is accumulated value along with the progress of i, $\theta(i)$ can be expressed as a monotonously increasing function as:ps $$\theta(i) = \alpha \cdot i + \beta \quad (10)$$

wherein $\alpha$ and $\beta$ are constants determinable dependent upon speakers, word sets, and surrounding noises, etc., and can be obtained experimentally. It may also possible to obtain $g_{min} = \min[g^n(i, j)]$, at each time 1, and $\theta(i) = g_{min} + \lambda$, wherein $\lambda$ is a constant to give allowance. When R0 is greater than $\theta(i)$, the operation for k is omitted. When $R0 \leq \theta(i)$, $n=n_2(k)$ and $j=j_2(k)$ are read out from the work memory 50, and are compared to n' and j' which have been determined in the operation of the block 111. Depending on the comparison result, the next step is selected from the processes $l_1$, $l_2$, $l_3$, $l_4$ (FIGS. 6C through 6E) and executed. The step $l_1$ corresponds to the operation under the condition (D), and the steps $l_2$, $l_3$, $l_4$ to (A), (B), and (C) respectively. The steps return to $l_5$ after all the steps are completed, and k is increased by one. The steps proceeds as $n \to n'$, $j \to j'$ in the block 111, and the steps after the block 113 are repeated. The distance calculation between vectors such as $d^n(i, j'+1)$ of the block 130 in the process $l_3$ is conducted by feeding n and $(j'+1)$ (not shown) to the reference pattern memory 40 and reading out $(b^n_{j'+1})$.

The operation of the block 112 judges whether all the data in the work memory 50 have already been processed, then the step goes to $l_6$ (FIG. 6B). The blocks 120 and 121 are the steps to execute the remaining operation for the last $(n', j')$. The data of $G_1$, $n_1$ and $j_1$ are transferred to $G_2$, $n_2$ and $j_1$ in the block 122. This is conducted not by the transfer of the data but by switching of the work memory from 50 to 60. By the process in the block 123, all the processes at the time i is completed, and the step proceeds to the next time point $(i+1)$.

At the time the above processes were completed to $i=I$, $g^n(I, J^n)$ data have been included in $G_1(k)$, $n_1(k)$ and $j_1(k)$ of the work memory 60. $G_1(k)$ for k where $j_1(k)=J^n$ under $n=n_1(k)$ indicates such data. They are used as the distance $(A, B^n)$ between the input pattern A and the reference pattern $B^n$, and n giving the minimum distance is outputted as the recognition result $n=n$.

The above statement describes the principle of this invention referring to the preferred embodiment, but the description by no means limits the scope of this invention. There may be the threshold $\theta(i)$ which can be used for the judgement block 114 shown in FIG. 6A other than that stated before. For instance, $\theta(i)$ may be linked with the minimum of $G_2(k) = g^n(i-1, j)$. Alternatively, a predetermined number from the smallest of $G_2(k) = g^n(i-1, j)$ may be selected, and the processing may be omitted for others than the above.

FIG. 7 shows an embodiment of an isolated word speech recognizer according to this invention. A speech waveform inputted via a microphone 110 is analyzed in frequency by an analyzer 120, converted into a time series of the feature vector $\vec{a}_i$, and inputted to a microprocessor 130. Code vectors $\vec{C}_k$ are stored in a code book 140, and reference pattern $B^n$ of each word n is stored in a reference memory 160 as a time series of the number $k(n, j)$ which designate the code vector number. D memory 150 temporarily stores the distance D(k) between the code vector $\vec{C}_k$ and the input vector $\vec{a}_i$. The g memory 170 is the work memory for the recurrence formula calculation (2) and stores $g^n(i, j)$ and $g^n(i-1, j)$ for required n and j. These memories 140, 150, 160 and 170 may be areas on the main memory of the microprocessor 130.

In response to the input of the first feature vector $\vec{a}_1$ of the input pattern, the microprocessor 130 performs an initial setting as below for the area $g^n(i-1, j)$ of the memory 170.

$$g^n(1, 1) = D(k(n, 1))$$

In other words, $k = k(n, 1)$ is read out from the reference pattern memory 160 for each word, and the code vector $\vec{C_k}$ corresponding thereto is read out from the code book 140 for calculating the distance from the feature vector $\vec{a_1}$ and setting the distance as the initial value $g^n(1, 1)$. For the part where $j \neq 1$, a numerical value sufficiently large is set.

Figure 8:
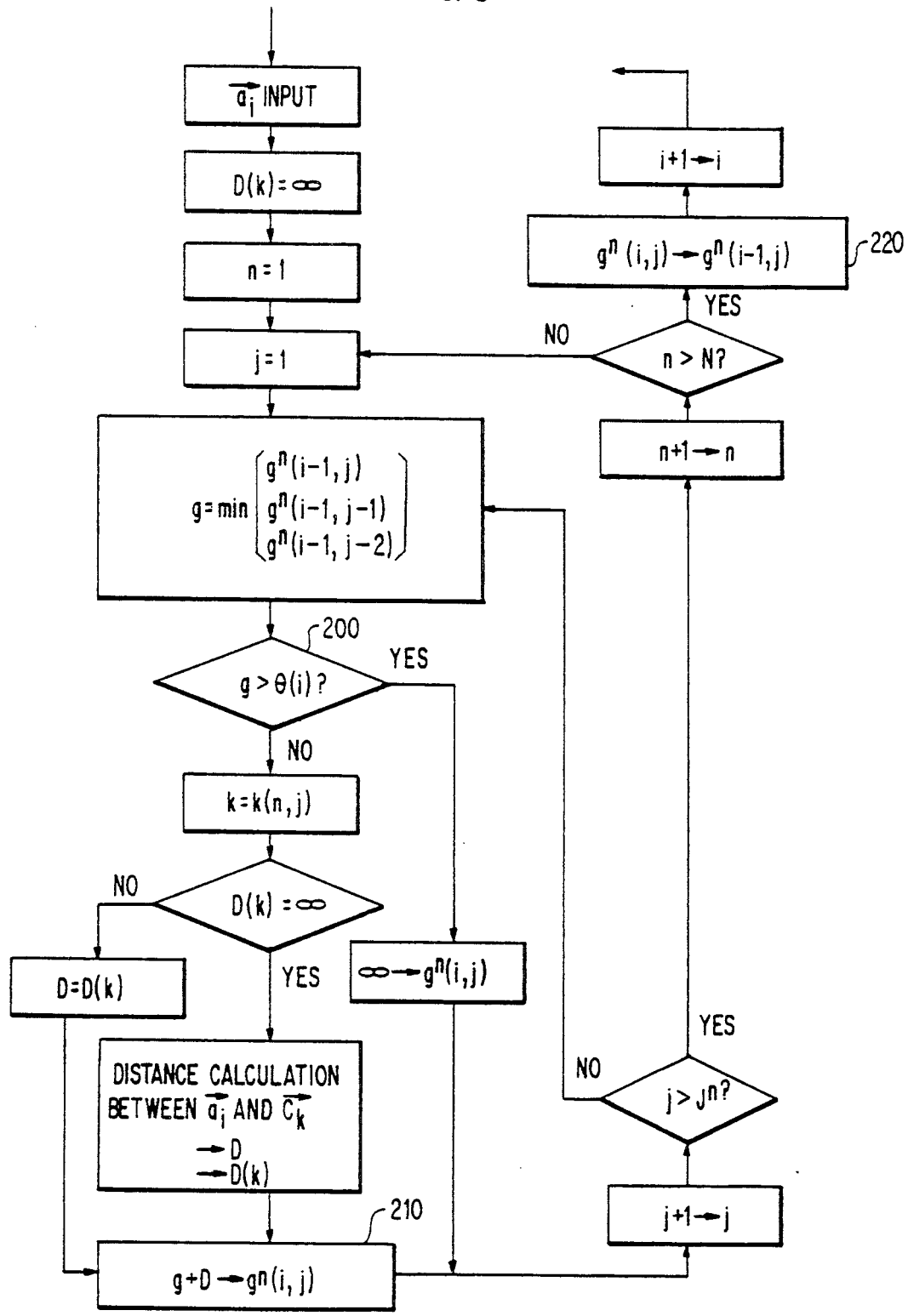
FIG. 8 is an operational flow chart of the embodiment of FIG. 7.

General operation at the time point i is shown in FIG. 8. In response to the input of a feature vector $\vec{a_i}$ all the contents D(k) of the D table (memory) 150 are reset with $\infty$. Then, the following processes are performed for $j = 1, 2, \ldots J^n$. The optimal cumulative values at the previous times $g^n(i-1, j)$, $g^n(i-1, j-1)$ and $g^n(i-1, j-2)$ are read out from the g memory 170 to determine the minimum g thereat. The determined cumulative value g is compared with the threshold $\theta(i)$ (in block 200) to judge whether or not the time point (i, j) is on the optimal path. When $g > \theta(i)$, it is judged that the point (i, j) is not on the optimal path. Under that condition, the calculation of the recurrence formula and distance is omitted and $\infty$ is set as $g^n(i, j)$. On the other hand, when $g \leq \theta(i)$, the point (i, j) is judged to be on the optimal path and the following recurrence formula calculation is performed.

In response to the value $k = (n, j)$ read out from the reference pattern memory 160, D(k) is read out from the D table 150. If D(k) is $\infty$, it is judged that the value D(k) has not yet been calculated, and the distance between the feature vector $\vec{a_i}$ and the code vector $\vec{C_k}$ read out from the code book is calculated to determine the value D and to write the same in the D table as D(k). When D(k) is not $\infty$, it is judged that the distance between the code vector $\vec{C_k}$ the feature vector $\vec{a_i}$ has already been calculated and $D = D(k)$ is established. These series of processings are carried out to calculate the distance between the code vector $\vec{C_k}$ designated by $k = k(n, j)$ and the feature vector $\vec{a_i}$ for the point of the n, i and j which is understood to be on the optimal path, thereby avoiding unnecessary calculations. Thus after the process $(g + D) \rightarrow g^n(i, j)$, the following recurrence formula is calculated similarly to the equations (2) and (4).

$$g^n(i, j) = D(k(n, j)) + \min \begin{bmatrix} g(i-1, j) \\ g(i-1, j-1) \\ g(i-1, j-2) \end{bmatrix} \quad (11)$$

This new optimal cumulative value is written in the g memory 170. The same processes are repeated for j and n to complete recurrence formula calculations at the time i. In the operation of the block 220, the area $g^n(i, j)$ is exchanged to the area $g^n(i-1, j)$ to provide the optimal cumulative value obtained at the time i as a past (previous) data, and the step proceeds to the next time point (i+1).

After completion of the speech input or $i = I$, the pattern distance $D(A, B^n)$ is stored in the g memory 170 for each word n. Thus obtained distances are compared to determine the word $n = \bar{n}$ giving the minimum distance and the word is generated as the recognition result. As described above, according to this invention, code vectors for which distance calculation is to be required at the time point are defined by the past optimal cumulative values, thereby the number of distance calculations can be reduced.

FIGS. 3A, 3B, 5 and 6A through 6E will be reviewed. In the manner described in connection with the memories 140, 150, 160 and 170, the microprocessor 30 includes a memory area. It is therefore readily possible to use a part of the memory area as an input pattern buffer for temporarily memorizing an input pattern A.

Various modifications are possible for the above embodiments. The distance calculation between $\vec{a_i}$ and $\vec{C_k}$ may be conducted in advance outside the loop of j and n.

What is claimed is:

1. A pattern matching system for carrying out pattern matching between a input pattern and a plurality of reference patterns having first through N-th pattern numbers, respectively, said input pattern being represented by a time sequence of input pattern features arranged at first through I-th input pattern time instants, respectively, said pattern matching system comprising:

a pattern memory for memorizing said reference patterns according to said first through said N-th pattern numbers and with each of said reference patterns represented by a time sequence of reference pattern features arranged at first through J-th reference pattern time instants, respectively, said J-th reference pattern time instant being specific to said each of the reference patterns;

calculating means connected to said pattern memory and supplied with said input pattern for calculating a current value of cumulative distances at a current input pattern time instant and a current reference pattern time instant and in connection with a current pattern number with said current input pattern time instant varied from said first input pattern time instant consecutively to said I-th input pattern time instant, with said current pattern number varied between said first and said N-th pattern numbers at said current input pattern time instant, and with said current reference pattern time instant varied between said first reference pattern time instant and the J-th reference pattern time instant of one of said reference patterns that has said current pattern number, said current value being calculated by a recurrence formula as a sum of an elementary distance and a minimum of a plurality of previous values of said cumulative distances, said elementary distance being a distance between one of said input pattern features and one of said reference pattern features of said one of the reference patterns, said one of the input pattern features being arranged at said current input pattern time instant, said one of the reference pattern features being arranged at said current reference pattern time instant, said previous values being calculated prior to said current pattern time instant;

selecting means connected to said calculating means for selecting said current value as a selected distance only when said current value is not greater than a threshold value which is predetermined in connection with said current input pattern time instant so as to linearly increase when said current input pattern time instant varies from said first input pattern time instant to said I-th input pattern time instant; and a result memory connected to said selecting means and accessed by a combination of said current pattern number and said current reference pattern time instant for memorizing said selected distance, said current pattern number, and said current reference pattern time instant as a previous distance, as a previous pattern number, and as a previous pattern time instant, respectively;

said calculating means being connected to said result memory to use said previous distance, said previous pattern number, and said previous reference pattern tim instant on calculating a different one of said cumulative distances at one of said first through said I-th input pattern time instants that is later than said current input pattern time instant.

2. A pattern matching system as claimed in claim 1 wherein said result memory comprises a first area and a second area, both connected to said selecting means, said first and said second areas being alternately used at said first through said I-th input pattern time instants for storage of said previous distance, said previous pattern number, and said previous reference pattern time instant and for read out of said previous distance on calculating said different one of the cumulative distances.

3. A method of carrying out pattern matching between an input pattern and a plurality of reference patterns having first through N-th pattern numbers, said input pattern being represented by a time sequence of input pattern features arranged at first through I-th input pattern time instants, respectively, each of said reference patterns being represented by a time sequence of reference pattern features arranged at first through J-th reference pattern time instants, respectively, said J-th reference pattern time instant being specific to said each of the reference patterns, said method comprising the steps of:

calculating a current value of cumulative distances at a current input pattern time instant and a current reference pattern time instant and in connection with a current pattern number with said current input pattern time instant varied from said first input pattern time instant consecutively to said I-th input pattern time instant, with said current pattern number varied between said first and said N-th pattern numbers at said current input pattern time instant, and with said current reference pattern time instant varied between said first reference pattern time instant and the J-th reference pattern time instant of one of said reference patterns that has said current pattern number, said current value being calculated by a recurrence formula as a sum of an elementary distance and a minimum of a plurality of previous values of said cumulative distances, said elementary distance being a distance between one of said input pattern features and one of said reference pattern features of said one of the reference patterns, said one of the input pattern features being arranged at said current input pattern time instant, said one of the reference pattern features being arranged at said current reference pattern time instant, and previous values being calculated prior to said current input pattern time instant;

selecting said current value as a selected distance only when said current value is not greater than a threshold value which is predetermined in connection with said current input pattern time instant so as to linearly increase when said current input pattern time instant varies from said first input pattern time instant to said I-th input pattern time instant;

memorizing in connecting with a combination of said current pattern number and said current reference pattern time instant said selected distance, said current pattern number, and said current reference pattern time as a previous distance, as a previous pattern number, and as a previous reference pattern time instant, respectively; and using said previous distance, said previous pattern number, and said previous reference pattern time instant on calculating a different one of said cumulative distances at one of said first through said I-th input pattern time instants that is later than said current input pattern time instant.

* * * * *

UNITED STATES PATENT AND TRADEMARK OFFICE
CERTIFICATE OF CORRECTION

PATENT NO. : 5,121,465
DATED : June 9, 1992
INVENTOR(S) : Hiroaki SAKOE

It is certified that error appears in the above-identified patent and that said Letters Patent is hereby corrected as shown below:

Col. 1, line 62, delete "ps";

line 65, delete "$a_i$", insert --$\vec{a}_i$--; and line 66, delete "$\vec{b}_n^n$"--, insert --$\vec{b}_j^n$--.

Col. 2, line 40, delete "$C_k$", insert --$\vec{C}_k$--.

Col 4, line 37, after "instant", insert --.--; delete "restriction";

delete lines 38 through 49 in their entirety.

Col. 5, line 14, delete "(1,j)", insert --(i-1,j)--.

Col. 6, line 10, delete "out by", insert --into--.

Col. 7, line 1, after "j'+1", insert -- $\rightarrow$ --;

line 4, delete "30", insert -- + --;

line 37, delete "$\vec{b}j^n$", insert --$\vec{b}^n j n$--; and line 64, delete "ps".

UNITED STATES PATENT AND TRADEMARK OFFICE
CERTIFICATE OF CORRECTION

PATENT NO. : 5,121,465
DATED : June 9, 1992
INVENTOR(S) : Hiroaki SAKOE

It is certified that error appears in the above-identified patent and that said Letters Patent is hereby corrected as shown below:

Col. 8, line 2, delete "(i,j)", insert --(i-1,j)--; and delete "1", insert --i--;

line 9, delete "$1_1, 1_2, 1_3, 1_4$", insert --$\ell_1, \ell_2, \ell_3, \ell_4$--;

line 10, delete "$1_1$", insert --$\ell_1$--;

line 12, delete "$1_2, 1_3, 1_4$", insert --$\ell_2, \ell_3, \ell_4$--;

line 13, delete "$1_5$", insert --$\ell_5$--;

line 17, delete "$1_3$", insert --$\ell_3$--;

line 22, delete "$1_0$", insert --$\ell_0$--; and line 37, delete "n=n", insert --$n=\hat{n}$--.

Col. 9, line 64, delete "n=n", insert --$n=\hat{n}$--.

UNITED STATES PATENT AND TRADEMARK OFFICE
CERTIFICATE OF CORRECTION

PATENT NO. : 5,121,465

DATED : June 9, 1992

INVENTOR(S) : Hiroaki Sakoe

It is certified that error appears in the above-identified patent and that said Letters Patent is hereby corrected as shown below:

Col. 11, line 9, delete "tim", insert --time--.

Signed and Sealed this

Ninth Day of November, 1993

Attest:

BRUCE LEHMAN

*Attesting Officer*      *Commissioner of Patents and Trademarks*